United States Patent
Kwon et al.

(10) Patent No.: US 10,179,521 B2
(45) Date of Patent: Jan. 15, 2019

(54) SYSTEM AND METHOD FOR CONTROLLING FRONT SEAT OF AUTOMOBILE IN CONNECTION WITH HEADREST

(71) Applicants: Hyundai Motor Company, Seoul (KR); Kia Motors Corporation, Seoul (KR)

(72) Inventors: Mi-Sun Kwon, Seoul (KR); Sang-Hark Lee, Incheon (KR); Ji-Hwan Kim, Seoul (KR); Yong-Suk Park, Suwon-si (KR); Han-Uk Keum, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 6 days.

(21) Appl. No.: 15/355,759

(22) Filed: Nov. 18, 2016

(65) Prior Publication Data
US 2018/0141465 A1    May 24, 2018

(30) Foreign Application Priority Data

Dec. 4, 2015    (KR) .................. 10-2015-0172741

(51) Int. Cl.
| B60N 2/806 | (2018.01) |
| B60N 2/06  | (2006.01) |
| B60N 2/02  | (2006.01) |
| B60N 2/22  | (2006.01) |
| B60N 2/16  | (2006.01) |
| B60N 2/48  | (2006.01) |

(52) U.S. Cl.
CPC ............. *B60N 2/0244* (2013.01); *B60N 2/06* (2013.01); *B60N 2/4805* (2013.01); *B60N 2/806* (2018.02); *B60N 2002/0272* (2013.01)

(58) Field of Classification Search
None
See application file for complete search history.

(56) References Cited

U.S. PATENT DOCUMENTS

| 4,797,824 A | * | 1/1989 | Sugiyama | ............ B60N 2/0224 |
| | | | | 296/65.16 |
| 5,095,257 A | * | 3/1992 | Ikeda | ..................... B60N 2/002 |
| | | | | 297/403 |
| 5,918,940 A | * | 7/1999 | Wakamatsu | ........... B60N 2/067 |
| | | | | 297/378.12 |

(Continued)

FOREIGN PATENT DOCUMENTS

| JP | 6-227297 A | 8/1994 |
| JP | 10-290728 A | 11/1998 |

(Continued)

*Primary Examiner* — Navid Ziaeianmehdizadeh
(74) *Attorney, Agent, or Firm* — Morgan, Lewis & Bockius LLP

(57) ABSTRACT

A system for controlling a front seat of an automobile in connection with a headrest may include a sensor inputter, electric seat inputter, and a seat controller, in which the seat controller may automatically lower a height of the headrest when the front seat of the automobile slides forward in an interior of the automobile, and the seat controller may automatically raise the height of the headrest when the front seat slides rearward in the interior of the automobile.

11 Claims, 6 Drawing Sheets

(56) References Cited

U.S. PATENT DOCUMENTS

| | | | | |
|---|---|---|---|---|
| 6,192,565 B1* | | 2/2001 | Tame | B60N 2/20 297/410 |
| 6,199,900 B1* | | 3/2001 | Zeigler | B60N 2/4829 280/730.2 |
| 6,523,417 B1* | | 2/2003 | Donahue | B60N 2/0224 250/221 |
| 6,568,754 B1* | | 5/2003 | Norton | B60N 2/4864 297/216.12 |
| 7,059,681 B2* | | 6/2006 | Kubo | B60N 2/3013 297/335 |
| 7,121,625 B2* | | 10/2006 | Malsch | B60N 2/4808 297/410 |
| 7,210,734 B1* | | 5/2007 | Yetukuri | B60N 2/06 297/378.12 |
| 7,374,239 B1* | | 5/2008 | Jayasuriya | B60N 2/4838 297/216.12 |
| 7,445,283 B2* | | 11/2008 | Mori | A47C 7/38 297/216.12 |
| 7,458,640 B1* | | 12/2008 | Hill | B60N 2/0244 297/408 |
| 7,878,596 B2* | | 2/2011 | Brunner | B60N 2/4832 297/378.12 |
| 8,061,777 B2* | | 11/2011 | Jensen | B60N 2/20 297/378.12 |
| 9,145,078 B2* | | 9/2015 | Locke | B60N 2/4829 |
| 9,399,420 B2* | | 7/2016 | Runde | B60N 2/4829 |
| 9,533,651 B1* | | 1/2017 | Ohno | B60R 21/23138 |
| 2001/0013718 A1* | | 8/2001 | Beck | B60N 2/20 297/410 |
| 2004/0113480 A1 | | 6/2004 | Reed et al. | |
| 2004/0217641 A1* | | 11/2004 | Lampke | B60N 2/4808 297/408 |
| 2005/0116523 A1* | | 6/2005 | Terada | B60N 2/0252 297/391 |
| 2005/0131609 A1* | | 6/2005 | Noda | B60N 2/0252 701/49 |
| 2005/0231018 A1* | | 10/2005 | Mori | B60N 2/06 297/410 |
| 2005/0242634 A1* | | 11/2005 | Serber | B60N 2/0745 297/216.1 |
| 2006/0055214 A1* | | 3/2006 | Serber | B60N 2/0745 297/216.1 |
| 2006/0103216 A1* | | 5/2006 | Hoekstra | B60N 2/20 297/410 |
| 2007/0135982 A1* | | 6/2007 | Breed | B60J 10/00 701/36 |
| 2007/0145803 A1* | | 6/2007 | Kopetzky | A47C 7/38 297/410 |
| 2008/0284226 A1* | | 11/2008 | Brunner | B60N 2/4817 297/410 |
| 2008/0290713 A1* | | 11/2008 | Oda | B60N 2/0232 297/408 |
| 2010/0052372 A1* | | 3/2010 | Yu | B60N 2/3011 297/61 |
| 2014/0319895 A1* | | 10/2014 | Lange-Mao | B60N 2/002 297/463.1 |
| 2017/0225591 A1* | | 8/2017 | Tobata | B60N 2/0244 |
| 2017/0291515 A1* | | 10/2017 | Soltner | A47C 7/38 |

FOREIGN PATENT DOCUMENTS

| | | |
|---|---|---|
| JP | 2000-166690 A | 6/2000 |
| JP | 2006-315623 A | 11/2006 |
| KR | 20-1998-01809 U | 7/1998 |
| KR | 20-1998-05511 U | 10/1998 |

* cited by examiner

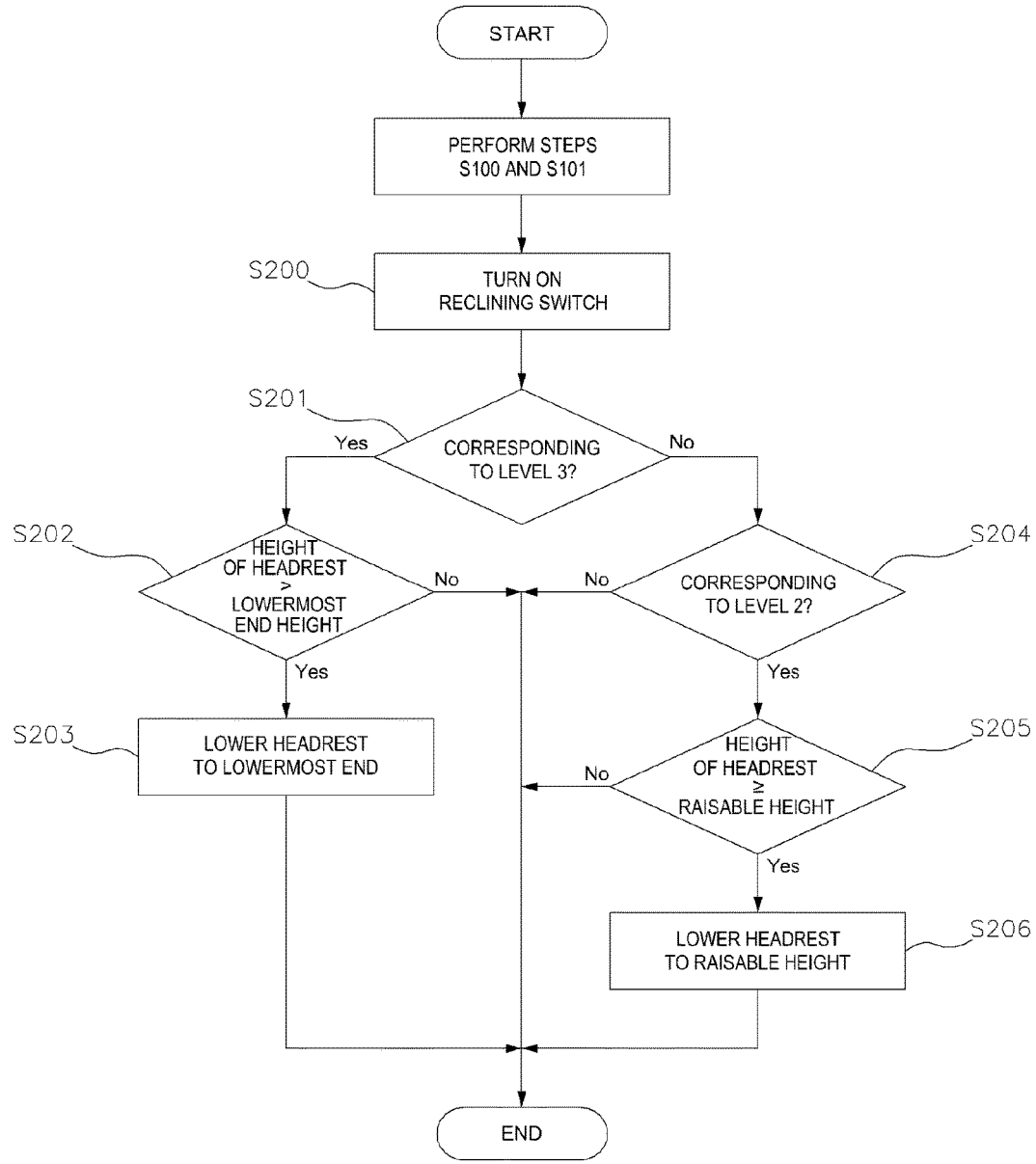

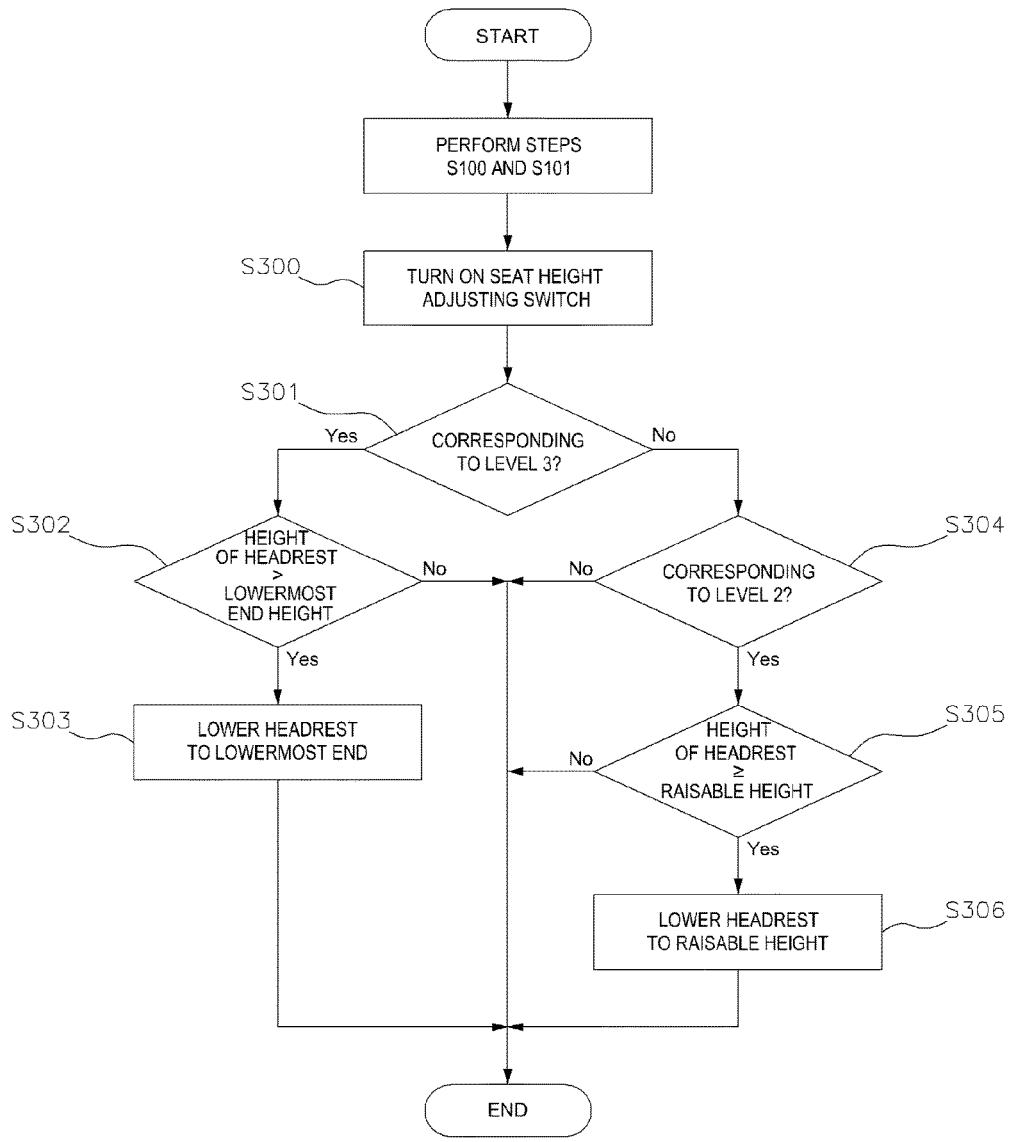

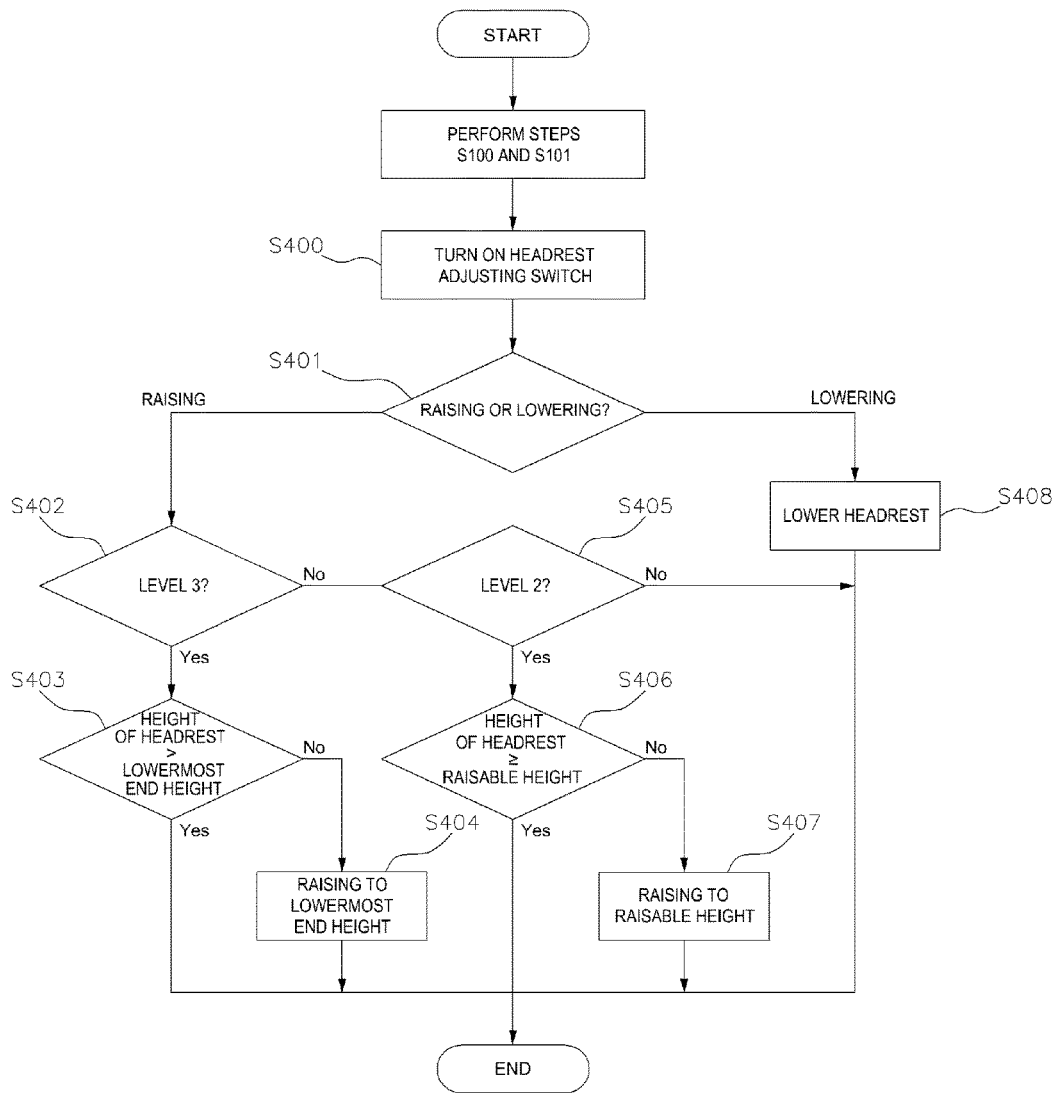

SYSTEM AND METHOD FOR CONTROLLING FRONT SEAT OF AUTOMOBILE IN CONNECTION WITH HEADREST

CROSS-REFERENCE TO RELATED APPLICATIONS

The present application claims priority to Korean Patent Application No. 10-2015-0172741, filed Dec. 4, 2015, the entire contents of which is incorporated herein for all purposes by this reference.

BACKGROUND OF THE INVENTION

Field of the Invention

The present invention relates to a system and a method for controlling a front seat in an interior of an automobile, and more particularly, to a system and a method for controlling a front seat of an automobile in connection with a headrest, which are characterized by automatically lowering a height of the headrest when the front seat of the automobile slides forward in the interior of the automobile, and automatically raising a height of the headrest when the front seat slides rearward in the interior of the automobile.

Description of Related Art

In general, seats installed in an interior of a passenger vehicle include a driver seat positioned at a front side in the interior, a front passenger seat positioned at a lateral side of the driver seat, and left and right rear seats positioned at a rear side in the interior.

In general, an occupant seated in the driver seat or the front passenger seat tends to adjust a slide position of the driver seat or the front passenger seat and a height of a headrest in accordance with his/her height.

That is, when a tall occupant is seated in a front seat, the occupant slides the front seat rearward and simultaneously raises the height of the headrest, but when a short occupant is seated in the front seat, the occupant slides the front seat forward and simultaneously lowers the height of the headrest.

Therefore, since the occupant needs to not only move the front seat forward or rearward in accordance with his/her height when the occupant is seated in the front seat, but also to adjust the height of the headrest, an additional amount of time is required to adjust the headrest, and this adjustment operation inconveniences the occupant. Moreover, if the occupant usually neglects to adjust the height of the headrest in order to avoid the inconvenience, there is concern that safety cannot be ensured in the event of an automobile accident because of the headrest with an inappropriately adjusted height.

The headrest may come into contact with a sun visor installed at a front side in the interior of the automobile during a process of adjusting the height of the headrest as described above. Therefore, there is a need for a means for avoiding interference with various types of structures, such as the sun visor, in the interior of the automobile at the time of adjusting the height of the headrest.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a system and a method for controlling a front seat of an automobile in connection with a headrest, which are capable of automatically adjusting a height of the headrest in accordance with frontward and rearward slide positions of the front seat, and avoiding interference with structures, such as a sun visor, in the interior of the automobile at the time of adjusting the height of the headrest.

According to various aspects of the present invention, a system for controlling a front seat of an automobile in connection with a headrest may include a sensor inputter, electric seat inputter, and a seat controller, in which the seat controller automatically lowers a height of the headrest when the front seat of the automobile slides forward in an interior of the automobile, and the seat controller automatically raises the height of the headrest when the front seat slides rearward in the interior of the automobile.

At a time of adjusting the height of the headrest, a degree to which the height of the headrest is adjusted may be restricted in order to prevent contact between the headrest and other components in the interior of the automobile.

The degree to which the height of the headrest is adjusted may be restricted by automatically raising or lowering the headrest in accordance with a slide position of the front seat, a height of the front seat, and a reclining angle of the front seat within a section in which the headrest is adjustable.

The sensor inputter may measure a slide position of the front seat, a height of the front seat, and a reclining angle of the front seat, the electric seat inputter may include switches for adjusting a sliding movement, the height, and the reclining angle of the front seat, and the seat controller may include a front seat adjuster that recognizes a slide position of the front seat, an angle of a backrest of the front seat, the height of the front seat, and a height and a slide position of the headrest by receiving signals input through the sensor inputter from the respective sensors, and adjusts the height of the headrest of the front seat based on the slide position of the front seat, the angle of the backrest of the front seat, the height of the seat, and the height and the slide position of the headrest.

According to various aspects of the present invention, a method for controlling a front seat of an automobile in connection with a headrest, the automobile comprising a sensor inputter which measures a slide position of the front seat, an electric seat inputter which includes a switch for sliding the front seat, and a seat controller which includes a front seat adjuster for controlling an operation of the front seat, may include automatically lowering, by the front seat adjuster, a height of the headrest in accordance with a position of the front seat input from the sensor inputter when the front seat of the automobile slides forward in the interior of the automobile by a switch operation of the electric seat inputter, and automatically raising, by the front seat adjuster, a height of the headrest in accordance with a position of the front seat input from the sensor inputter when the front seat of the automobile slides rearward in the interior of the automobile by a switch operation of the electric seat inputter.

The method may further include obtaining, by the sensor inputter, current position information of the front seat by determining a forward or rearward slide position of the front seat by receiving a signal from a slide motor sensor, determining an angle of a backrest of the front seat by receiving a signal from a reclining motor sensor, and determining a height of the front seat by receiving a signal from a height adjusting motor sensor, determining, by the seat controller, a headrest height adjustable section based on the obtained current position information of the front seat, and determining, by the front seat adjuster, whether the front seat is moved forward or rearward based on the automobile by receiving a slide switch value from the electric seat inputter when the slide switch is turned on to slide the front seat forward or rearward, and lowering, by the front seat adjuster, the height of the headrest proportionately to a forward movement distance of the front seat when the front seat is moved forward.

The method may further include raising, by the front seat adjuster, the height of the headrest proportionately to a rearward movement distance of the front seat when the front seat is moved rearward as a result of the determination whether the front seat is moved forward or rearward.

The lowering the headrest may include dividing, by the front seat adjuster, a separation distance from an interior rearmost position to an interior foremost position of the front seat into a plurality of distance sections, setting a predetermined height of the headrest corresponding to each of the divided distance sections, and lowering the headrest to a height corresponding to a designated distance section when the front seat is positioned in the distance section.

The raising the height of the headrest may include dividing, by the front seat adjuster, a separation distance from an interior foremost position to an interior rearmost position of the front seat into a plurality of distance sections, setting a predetermined height of the headrest corresponding to each of the divided distance sections, and raising the headrest to a height corresponding to a designated distance section when the front seat is positioned in the distance section.

In the raising the height of the headrest, when the front seat is moved rearward, the height of the headrest may be raised only to a limit height in accordance with the headrest height adjustable section determined in the determining the headrest height adjustable section based on the obtained current position information.

In the raising the height of the headrest, when the front seat is moved rearward, the height of the headrest may be lowered to a lowermost end in accordance with the headrest height adjustable section determined in the determining the headrest height adjustable section based on the obtained current position information.

The method may further include obtaining, by the sensor inputter, current position information of the front seat by determining a forward or rearward slide position of the front seat by receiving a signal from a slide motor sensor, determining an angle of a backrest of the front seat by receiving a signal from a reclining motor sensor, and determining a height of the front seat by receiving a signal from a height adjusting motor sensor, determining, by the seat controller, a headrest height adjustable section based on the obtained current position information of the front seat, and setting a level of limitation to level 2 when the headrest height adjustable section is available only to a limit height, setting a level of limitation to level 3 when a position of the headrest needs to be positioned at a lowermost end, determining, by the front seat adjuster, whether the headrest height adjustable section determined in the determining the headrest height adjustable section, corresponds to level 3 when a reclining switch is turned on in order to recline a backrest of the front seat, determining, by the front seat adjuster, whether the height of the headrest is higher than a lowermost end height of the headrest which is defined at level 3 when the headrest height adjustable section corresponds to level 3, and lowering, by the front seat adjuster, the headrest to the lowermost end height when the height of the headrest is higher than the lowermost end height of the headrest as a result of the determination.

The method may further include determining, by the front seat adjuster, whether the headrest height adjustable section is level 2 when the headrest height adjustable section is not level 3 in the determining whether the headrest height adjustable section corresponds to level 3, determining, by the front seat adjuster, whether the height of the headrest is equal to or higher than a raisable height which is defined at level 2 when the headrest height adjustable section corresponds to level 2 as a result of the determination, and lowering, by the front seat adjuster, the height of the headrest to the raisable height which is defined at level 2 when the height of the headrest is equal to or higher than the raisable height.

The method may further include obtaining, by the sensor inputter, current position information of the front seat by determining a forward or rearward slide position of the front seat by receiving a signal from a slide motor sensor, determining an angle of a backrest of the front seat by receiving a signal from a reclining motor sensor, and determining a height of the front seat by receiving a signal from a height adjusting motor sensor, determining, by the seat controller, a headrest height adjustable section based on the obtained current position information of the front seat, and setting a level of limitation to level 2 when the headrest height adjustable section is available to a limit height, setting a level of limitation to level 3 when a position of the headrest needs to be positioned at a lowermost end, determining, by the front seat adjuster, whether the headrest height adjustable section determined in the determining the headrest height adjustable section based on the obtained current position information of the front seat corresponds to level 3 when a height adjusting switch is turned on in order to adjust the height of the front seat, determining, by the front seat adjuster, whether the height of the headrest is higher than a lowermost end height of the headrest which is defined at level 3 when the headrest height adjustable section corresponds to level 3, and lowering, by the front seat adjuster, the headrest to the lowermost end height when the height of the headrest is higher than the lowermost end height of the headrest as a result of the determination.

The method may further include determining, by the front seat adjuster, whether the headrest height adjustable section is level 2 when the headrest height adjustable section is not level 3 in the determining whether the headrest height adjustable section corresponds to level 3 when the height adjusting switch is turned on in order to adjust the height of the front seat, determining, by the front seat adjuster, whether the height of the headrest is equal to or higher than a raisable height which is defined at level 2 when the headrest height adjustable section corresponds to level 2 as a result of the determination, and lowering, by the front seat adjuster, the height of the headrest to the raisable height which is defined at level 2 when the height of the headrest is equal to or higher than the raisable height.

The method may further include obtaining, by the sensor inputter, current position information of the front seat by determining a forward or rearward slide position of the front seat by receiving a signal from a slide motor sensor, determining an angle of a backrest of the front seat by receiving a signal from a reclining motor sensor, and determining a height of the front seat by receiving a signal from a height adjusting motor sensor, determining, by the seat controller, a headrest height adjustable section based on the obtained current position information of the front seat, and setting a level of limitation to level 2 when the headrest height adjustable section is available only to a limit height, setting a level of limitation to level 3 when a position of the headrest needs to be positioned at a lowermost end, determining, by the front seat adjuster, whether the headrest is to be raised or lowered based on a switch on signal when the headrest height adjusting switch is turned on in order to adjust the height of the headrest of the front seat, determining, by the front seat adjuster, whether the headrest height adjustable section determined in the determining the headrest height adjustable section based on the obtained current position information of the front seat corresponds to level 3 when the headrest is to be raised as a result of the determination, determining, by the front seat adjuster, whether the height of the headrest is higher than a lowermost end height of the headrest which is defined at level 3 when the headrest height adjustable section corresponds to level 3, and raising, by the front seat adjuster, the headrest to the lowermost end height when the height of the headrest is below the lowermost end height of the headrest.

The method may further include determining, by the front seat adjuster, whether the headrest height adjustable section is level 2 when the headrest height adjustable section is not level 3 in the determining whether the headrest height adjustable section based on the obtained current position information of the front seat corresponds to level 3 when the headrest is to be raised as a result of the determination, determining, by the front seat adjuster, whether the height of the headrest is equal to or higher than a raisable height which is defined at level 2 when the headrest height adjustable section corresponds to level 2 as a result of the determination, raising, by the front seat adjuster, the headrest to the raisable height when the headrest height adjustable section is not level 2 and the height of the headrest is already below the raisable height which is defined at level 2, and lowering, by the front seat adjuster, the headrest in accordance with an adjustment degree of the switch when the headrest is to be lowered based on the switch on signal in the determining whether the headrest is to be raised or lowered based on the switch on signal because there is no interference between the headrest and a structure in an interior of the automobile.

According to the system for controlling the front seat of the automobile in connection with the headrest which is configured as described above, the height of the headrest may be automatically adjusted in accordance with the forward and rearward slide positions of the front seat, and as a result, the occupant need not inconveniently adjust the height of the headrest, such that user convenience may be improved. Moreover, the height of the headrest may be automatically adjusted in accordance with the occupant's height, and as a result, it is possible to further improve safety of the occupant.

The height of the headrest is adjusted to avoid interference with structures, such as a sun visor, in the interior of the automobile, and as a result, it is possible to prevent damage caused by contact or a collision with the structures.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 4 is a flowchart illustrating a method of controlling the height of the headrest at the time of reclining the front seat according to various embodiments of the present invention.

FIG. 5 is a flowchart illustrating a method of controlling the height of the headrest at the time of adjusting a height of the front seat according to various embodiments of the present invention.

FIG. 6 is a flowchart illustrating a method of controlling the height of the headrest at the time of moving the headrest of the front seat upward or downward according to various embodiments of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1A:
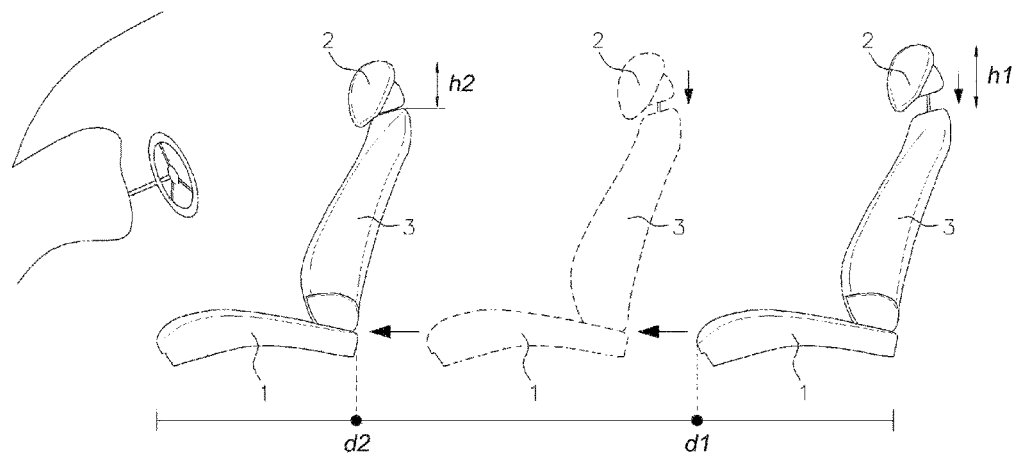
FIG. 1A and FIG. 1B are conceptual views illustrating states in which a height of a headrest is being adjusted in accordance with a sliding movement of a front seat according to various embodiments of the present invention.
Figure 1B:
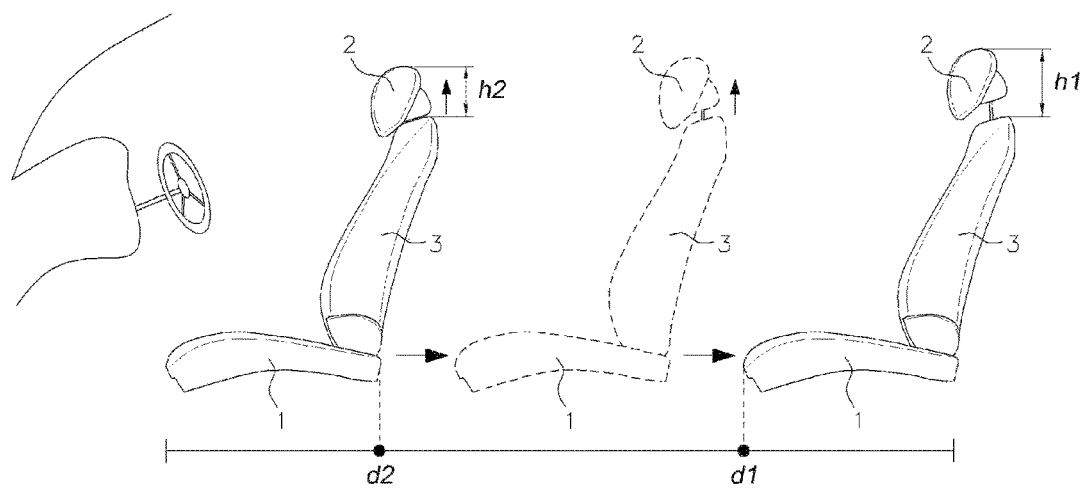

FIG. 1A and FIG. 1B are conceptual views illustrating states in which a height of a headrest is being adjusted in accordance with a sliding movement of a front seat according to various embodiments of the present invention.

First, for convenience of description, among seats installed in an automobile, a driver seat installed at a front side in an interior of the automobile or a front passenger seat installed at a lateral side of the driver seat is referred to as a front seat, and a left or right rear seat installed at a rear side in an interior of the automobile is referred to as a rear seat.

The front and rear seats are electric seats, in which respective parts of the seat are moved and adjusted by driving power of a motor.

A system for adjusting a height of a headrest in accordance with a sliding movement of the front seat according to various embodiments of the present invention is a system that automatically lowers a height of a headrest 2 when a seat 1 slides forward in the interior of the automobile as illustrated in FIG. 1A, and automatically raises the height of the headrest 2 when the seat 1 slides rearward in the interior of the automobile as illustrated in FIG. 1B.

In this case, regarding a separation distance between a position before the seat 1 is moved and a position after the seat 1 is moved, a distance from a rearmost point d1 of the front seat in the interior of the automobile to a foremost point d2 of the front seat in the interior of the automobile is a maximum separation distance. A degree to which the height of the headrest is adjusted is as much as a difference between a length h1 from a backrest 3 of the seat 1 to an upper end of the headrest 2 at an initial position and a length h2 from the backrest 3 of the seat 1 to the upper end of the headrest 2 at a position at which the headrest is completely moved.

Therefore, the system according to various embodiments of the present invention, which operates as described above, may automatically adjust the height of the headrest in accordance with the forward and rearward slide position of the front seat, and as a result, the occupant need not inconveniently adjust the height of the headrest, such that user convenience may be improved. Moreover, the height of the headrest may be automatically adjusted in accordance with the occupant's height, and as a result, it is possible to enhance a function of protecting the occupant.

Figure 2:
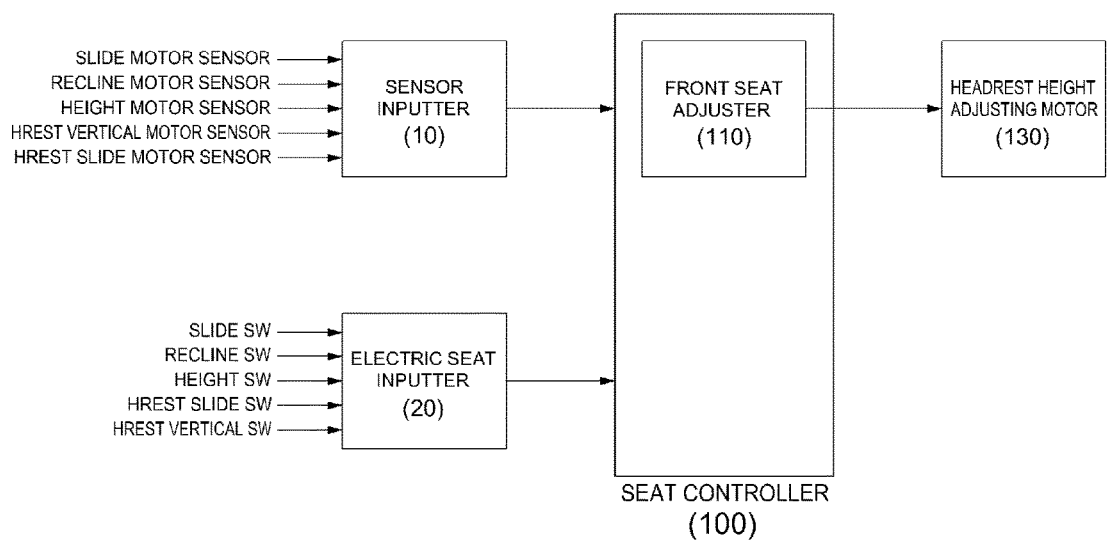
FIG. 2 is a block diagram of a system for controlling the front seat according to various embodiments of the present invention.

FIG. 2 is a block diagram of the front seat control system according to various embodiments of the present invention for adjusting the height of the headrest in accordance with the sliding movement of the seat, and the system according to the present invention will be described in detail with reference to the drawings.

The front seat control system according to various embodiments of the present invention includes a sensor inputter 10 and an electric seat inputter 20 which are controlled by a central controller that controls all electrical components in the automobile in a unified manner, and a seat controller 100.

The sensor inputter 10 has a means for measuring a forward or rearward movement position of the front seat, which detects the forward or rearward slide position of the front seat by receiving sensor input from a slide motor sensor (SLIDE MOTOR SENSOR) that detects a rotation amount of a slide motor installed in the front seat.

The sensor inputter 10 receives a sensor signal from a reclining motor sensor (RECLINE MOTOR SENSOR) that detects a rotation amount of a reclining motor installed in the front seat in order to measure an angle of the backrest of the front seat.

The sensor inputter 10 receives a sensor signal from a height adjusting motor sensor (HEIGHT MOTOR SENSOR) that detects a rotation amount of a height adjusting motor installed in the front seat in order to measure a seating height of the front seat.

The sensor inputter 10 receives a sensor signal from a headrest height adjusting motor sensor (HREST VERTICAL MOTOR SENSOR) that detects a rotation amount of a headrest height adjusting motor in order to measure the height of the headrest of the front seat.

The sensor inputter 10 receives a sensor signal from a headrest slide motor sensor (HREST SLIDE MOTOR SENSOR) that detects a rotation amount of a slide motor of the headrest in order to measure the forward or rearward position of the headrest of the front seat.

Therefore, the sensor inputter 10 receives signals from the aforementioned sensors, and may recognize the position of the front seat, the angle of the backrest of the front seat, the height of the front seat, the height of the headrest, and the forward or rearward position of the headrest.

The electric seat inputter 20 is a switch input terminal which adjusts a position of the electric seat, and has a switch (SLIDE SW) for operating the slide motor installed in the front seat, a switch (RECLINE SW) for operating the reclining motor of the backrest of the front seat, a switch (HEIGHT SW) for operating the height adjusting motor of the front seat, a switch (HREST VERTICAL SW) for moving the headrest upward and downward, and a switch (HREST SLIDE SW) for moving the headrest forward and rearward.

The seat controller 100 includes a front seat adjuster 110 for adjusting the position of the front seat.

In general, the seat controller 100 for an automobile has a rear seat adjuster for adjusting a position of the rear seat, and a lumbar support controller for supporting a lumbar spine, but the rear seat adjuster and the lumbar support controller are not illustrated in the drawings of the specification of various embodiments of the present invention.

In this case, the front seat adjuster 110 controls an operation of a headrest height adjusting motor 130, thereby adjusting the height of the headrest installed on the front seat.

The front seat control system according to various embodiments of the present invention, which is configured as described above, receives signals input through the sensor inputter 10 from the respective sensors, recognizes the slide position of the front seat, the angle of the backrest of the front seat, the height of the seat, and the height and the slide position of the headrest, and then adjusts the height of the headrest of the front seat based on the slide position of the front seat, the angle of the backrest of the front seat, the height of the seat, and the height and the slide position of the headrest.

An adjustment degree of the height of the headrest is controlled to be restricted in order to prevent the headrest from coming into contact with a roof surface or a sun visor in the interior space of the automobile at the time of adjusting the height of the headrest.

That is, in a case in which the height of the headrest is automatically adjusted in accordance with the slide position of the front seat, the headrest is controlled to be automatically raised or lowered up or down to a headrest adjustable section in accordance with the slide position, the height, and the reclining angle of the front seat.

In contrast, in a case in which the occupant manually adjusts the height of the headrest by using a headrest height adjusting switch, the headrest is controlled to be raised or lowered only within the headrest adjustable section.

The following Table 1 shows operable sections of the headrest in accordance with the height of the front seat, the slide position of the front seat, and the angle of the backrest in order to adjust the height of the headrest according to various embodiments of the present invention.

TABLE 1

| Case | Seat Height (h) | Slide Position (P) of Front Seat | Angle (R)(°) of Backrest of Front Seat | Headrest Height Adjustable Section |
|---|---|---|---|---|
| First | h ≤ First Reference Height (h1) | Entire Section (All Sections) | Entire Section (All Sections) | Entire Section (All Sections) Height Adjustable |
| Second | First Reference Height (h1) < H ≤ Second Reference Height (h2) | P is positioned in a section up to the first reference position (P1). | First Reference Angle (R1) < R ≤ Second Reference Angle (R2) | Front Passenger Seat Lowermost end Driver Seat Raisable only to Limit Height (V) |
| | | P is positioned in a section up to the first reference position (P1). | 0 ≤ R ≤ First Reference Angle (R1) | Entire Section (All Sections) Height Adjustable |
| | | P exceeds the first reference position (P1) and is positioned in a section up to the second reference position (P2). | Entire Section (All Sections) | Entire Section (All Sections) Height Adjustable |
| Third | Second Reference Height (h2) < H ≤ Third Reference Height (h3) | P is positioned in a section up to the third reference position (P3). | Third Reference Angle (R3) < R ≤ Fourth Reference Angle (R4) | Lowermost end |
| | | P is positioned in a section up to the third reference position (P3). | Fifth Reference Angle (R5) < R ≤ Third Reference Angle (R3) | Raisable only to Limit Height (V) |
| | | P is positioned in a section up to the third reference position (P3). | 0 ≤ R ≤ Fifth Reference Angle (R5) | Entire Section (All Sections) Height Adjustable |
| | | P exceeds the third reference position (P3) and is positioned in a section up to the fourth reference position (P4). | Sixth Reference Angle (R6) < R ≤ Seventh Reference Angle (R7) | Raisable only to Limit Height (V) |
| | | P exceeds the third reference position (P3) and is positioned in a section up to the fourth reference position (P4). | 0 ≤ R ≤ Sixth Reference Angle (R6) | Entire Section (All Sections) Height Adjustable |

In Table 1, in various embodiments of the present invention, the first reference height h1 of the seat height may be set in a range of 10 to 20 mm, the second reference height h2 may be set in a range of 20 to 40 mm, and the third reference height h3 may be set in a range of 40 to 70 mm.

In Table 1, the first reference position P1 of the slide position P of the front seat according to the present invention may be set in a range from a position at which the front seat has slid to a foremost side in the interior of the automobile to a position at which the front seat has slid rearward by 40 to 80 mm, the second reference position P2 may be set in a range from a position at which the front seat has slid to the foremost side in the interior of the automobile to a position at which the front seat has slid rearward by 240 to 300 mm, the third reference position P3 may be set in a range from a position at which the front seat has slid to the foremost side in the interior of the automobile to a position at which the front seat has slid rearward by 160 to 200 mm, and the fourth reference position P4 may be set in a range from a position at which the front seat has slid to the foremost side in the interior of the automobile to a position at which the front seat has slid rearward by 240 to 300 mm.

In Table 1, the first reference angle R1 of the backrest of the front seat according to the present invention may be set in a range of 60 to 80 degrees, the second reference angle R2 may be set in a range of 90 to 130 degrees, the third reference angle R3 may be set in a range of 60 to 80 degrees, the fourth reference angle R4 may be set in a range of 90 to 130 degrees, the fifth reference angle R5 may be set in a range of 50 to 70 degrees, the sixth reference angle R6 may be set in a range of 50 to 70 degrees, and the seventh reference angle R7 may be set in a range of 90 to 130 degrees.

In Table 1, a raisable limit height V of the headrest according to various embodiments of the present invention may be set in a range of 35 to 50 mm.

Hereinafter, an operating process of the system for controlling the front seat of the automobile in connection with the headrest according to various embodiments of the present invention, which is configured as described above, will be described in detail with reference to the attached FIGS. 3 to 6. An operation of manually adjusting the height of the headrest by using the switch (SLIDE SW) for operating the slide motor of the front seat, the switch (RECLINE SW) for operating the reclining motor of the backrest of the front seat, the switch (HEIGHT SW) for operating the height adjusting motor of the front seat, and the headrest height adjusting switch, which transmit signals to the electric seat inputter 20, will be described in a summarized manner.

Figure 3:
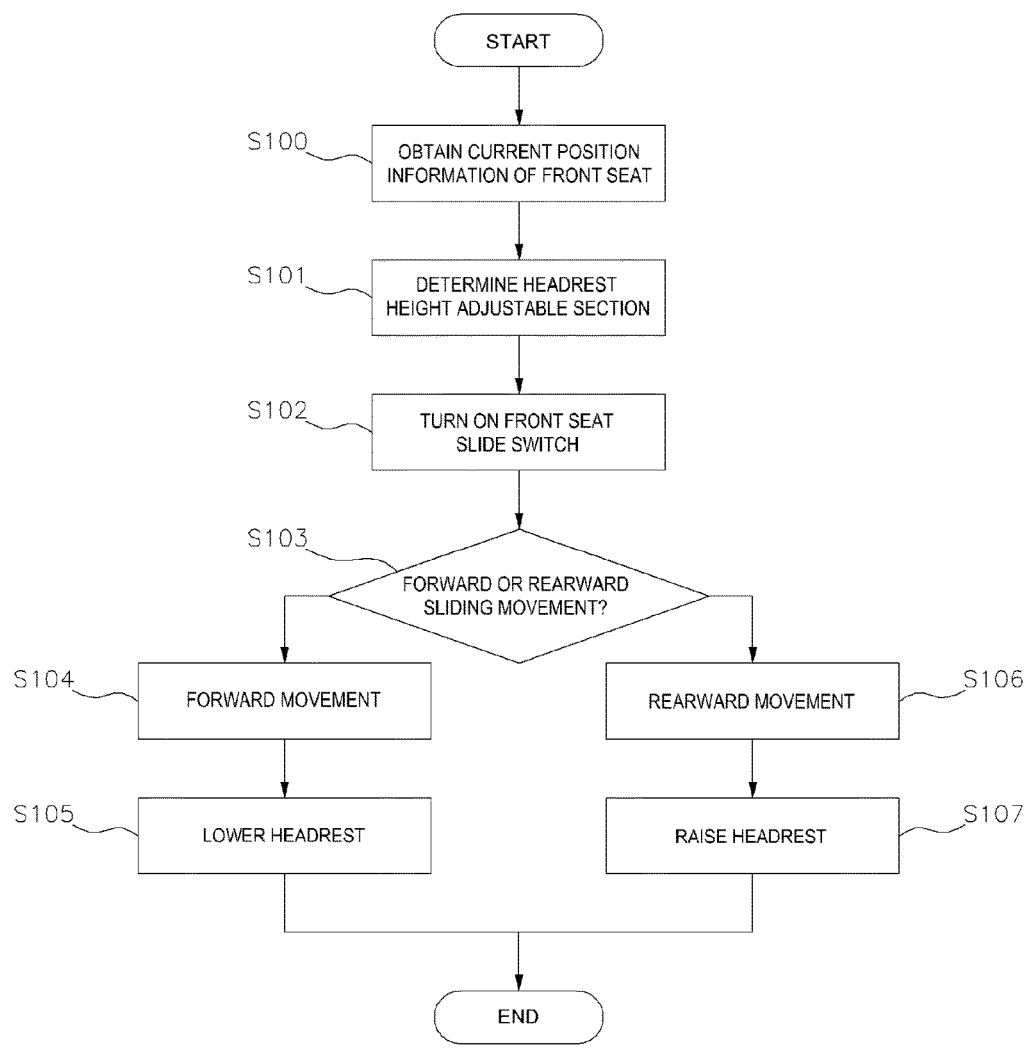
FIG. 3 is a flowchart illustrating a method of controlling the height of the headrest at the time of sliding the front seat according to various embodiments of the present invention.

1) At the time of sliding the front seat:

FIG. 3 is a flowchart illustrating a method of controlling the height of the headrest at the time of sliding the front seat according to various embodiments of the present invention.

Referring to the drawing, the sensor inputter 10 calculates the forward or rearward slide position of the front seat by receiving a signal from the slide motor sensor (SLIDE MOTOR SENSOR), calculates the angle of the backrest of the front seat by receiving a signal from the reclining motor sensor (RECLINE MOTOR SENSOR), and calculates the height of the front seat by receiving a signal from the height adjusting motor sensor (HEIGHT MOTOR SENSOR), thereby obtaining current position information of the front seat (S100).

Next, the seat controller 100 determines a headrest height adjustable section based on the obtained current position information of the front seat (S101).

As shown in the aforementioned Table 1, the determination of the headrest height adjustable section is the determination of limitations associated with the adjustment of the height of the headrest, such as whether the height of the headrest is adjustable in the entire section in accordance with the height, the slide position, and the reclining angle of the seat, or whether the position of the headrest needs to be positioned at a lowermost end, or whether the height of the headrest is raisable only to the limit height V.

Here, for convenience of description, regarding a level of limitation at the time of adjusting the height of the headrest, a level of limitation in a case in which the headrest height adjustable section is the entire section is referred to as level 1, a level of limitation in a case in which the height of the headrest is adjustable only to the limit height V is referred to as level 2, and a level of limitation in a case in which the position of the headrest needs to be positioned at the lowermost end is referred to as level 3. In this case, the number of levels, which represent the level of limitation, may of course be increased or decreased as necessary.

Subsequently, when the slide switch is turned on in order to slide the front seat forward or rearward (S102), the front seat adjuster 110 receives a slide switch value from the electric seat inputter 20 and determines whether the front seat is moved forward or rearward based on the automobile (S103), and when the front seat is moved forward (S104), the front seat adjuster 110 lowers the headrest proportionately to a forward movement distance of the front seat (S105).

In particular, in step S105, as described with reference to FIG. 1, the front seat adjuster 110 divides the separation distance (distance from point d1 to point d2) from the interior rearmost position to the interior foremost position of the front seat into a plurality of distance sections, sets a predetermined height of the headrest which corresponds to each of the divided distance sections, and then lowers the headrest to a height corresponding to a designated distance section when the front seat is positioned in the designated distance section.

In various embodiments of the present invention, the forward movement distance of the front seat is divided into five sections, and the height of the headrest is gradually lowered to provide a predetermined height for each section.

As described above, when the front seat is moved forward, the height of the headrest is gradually lowered, such that the headrest does not come into contact with a roof or a sun visor in the interior of the automobile, and as a result, there is no height limitation in the headrest height adjustable section determined in step S101.

In contrast, when the front seat is moved rearward as a result of the determination in step S103 (S106), the front seat adjuster 110 raises the height of the headrest proportionately to a rearward movement distance of the front seat (S107).

In particular, in step S107, like the forward movement of the front seat, the front seat adjuster 110 divides the separation distance (see FIG. 1) from the interior foremost position to the interior rearmost position of the front seat into a plurality of distance sections, sets a predetermined height of the headrest which corresponds to each of the divided distance sections, and then raises the headrest to a height corresponding to a designated distance section when the front seat is positioned in the designated distance section.

In various embodiments of the present invention, the rearward movement distance of the front seat is divided into five sections, and the height of the headrest is gradually raised to provide a predetermined height for each section.

In this case, in step S107, if the front seat is moved rearward, the height of the headrest is gradually increased and likely to come into contact with the roof or the sun visor in the interior of the automobile. To prevent this interference, the height of the headrest is restricted in accordance with a level of the headrest height adjustable section determined in step S101.

That is, the rearward movement distance of the front seat is divided into approximately three to five distance sections, and the height of the headrest is gradually raised to a predetermined height corresponding to each of the divided distance sections, such that when the headrest height adjustable section determined in step S101 corresponds to level 2, the headrest is raisable only to the limit height V instead of being raised in the entire headrest height adjustable section even though the front seat still slides rearward. If the headrest height adjustable section determined in step S101 corresponds to level 3, the headrest is operated to be automatically moved to the lowermost end.

Therefore, as described above, the headrest according to the present invention is lowered or raised in accordance with the forward or rearward sliding movement of the front seat, and particularly, when the headrest is raised, a height to which the headrest is raised is restricted to prevent interference with structures in the interior of the automobile.

2) At the time of reclining the front seat:

FIG. 4 is a flowchart illustrating a method of controlling the height of the headrest at the time of reclining the backrest of the front seat according to the present invention.

Referring to the drawing, at the time of reclining the backrest of the front seat, like the flowchart at the time of sliding the front seat, the sensor inputter 10 calculates the forward or rearward slide position of the front seat by receiving signals from the sensors, calculates the angle of the backrest of the front seat, and calculates the height of the front seat by receiving a signal from the height adjusting motor sensor, thereby obtaining current position information of the front seat (S100). Subsequently, the seat controller 100 determines the headrest height adjustable section in accordance with the obtained current position information of the front seat (S101).

When the reclining switch is turned on in order to recline the backrest of the front seat (S200), the front seat adjuster 110 determines whether the headrest height adjustable section determined in step S101 corresponds to level 3 (S201), and if the headrest height adjustable section corresponds to level 3, the front seat adjuster 110 determines whether the height of the headrest is higher than a lowermost end height of the headrest which is defined at level 3 (S202). As a result of the determination, if the height of the headrest is higher than the lowermost end height of the headrest, the front seat adjuster 110 lowers the headrest to the lowermost end height (S203).

In contrast, if in step S202, the height of the headrest is already the lowermost end height of the headrest which is defined at level 3, the process is ended without adjusting the height of the headrest.

Meanwhile, if in step S201, the headrest height adjustable section is not level 3, the front seat adjuster 110 determines whether the headrest height adjustable section is level 2 (S204), and as a result of the determination, if the headrest height adjustable section corresponds to level 2, the front seat adjuster 110 determines whether the height of the headrest is equal to or higher than the raisable height V which is defined at level 2 (S205). If the height of the headrest is equal to or higher than the raisable height V, the front seat adjuster 110 lowers the height of the headrest to the raisable height V which is defined at level 2 (S206).

In contrast, in a case in which in step S204, the headrest height adjustable section is not level 2 and in a case in which in step S205, the height of the headrest is already below the raisable height V which is defined at level 2, the process is ended without adjusting the height of the headrest.

3) At the time of adjusting the height of the front seat:

FIG. 5 is a flowchart illustrating a method of controlling the height of the headrest at the time of adjusting the height of the front seat according to various embodiments of the present invention.

Referring to the drawing, at the time of raising the height of the front seat, like the flowchart at the time of reclining the front seat, the sensor inputter 10 calculates the forward or rearward slide position of the front seat by receiving signals from the sensors, calculates the angle of the backrest of the front seat, and calculates the height of the front seat by receiving a signal from the height adjusting motor sensor, thereby obtaining current position information of the front seat (S100). Subsequently, the seat controller 100 determines the headrest height adjustable section in accordance with the obtained current position information of the front seat (S101).

When the height adjusting switch is turned on in order to adjust the height of the front seat (S300), the front seat adjuster 110 determines whether the headrest height adjustable section determined in step S101 corresponds to level 3 (S301), and if the headrest height adjustable section corresponds to level 3, the front seat adjuster 110 determines whether the height of the headrest is higher than the lowermost end height of the headrest which is defined at level 3 (S302). As a result of the determination, if the height of the headrest is higher than the lowermost end height of the headrest, the front seat adjuster 110 lowers the headrest to the lowermost end height (S303).

In contrast, if in step S302, the height of the headrest is already the lowermost end height of the headrest which is defined at level 3, the process is ended without adjusting the height of the headrest.

Meanwhile, if in step S301, the headrest height adjustable section is not level 3, the front seat adjuster 110 determines whether the headrest height adjustable section is level 2 (S304), and as a result of the determination, if the headrest height adjustable section corresponds to level 2, the front seat adjuster 110 determines whether the height of the headrest is equal to or higher than the raisable height V which is defined at level 2 (S305). If the height of the headrest is equal to or higher than the raisable height V, the front seat adjuster 110 lowers the height of the headrest to the raisable height V which is defined at level 2 (S306).

In contrast, in a case in which in step S304, the headrest height adjustable section is not level 2 and in a case in which in step S305, the height of the headrest is already below the raisable height V which is defined at level 2, the process is ended without adjusting the height of the headrest.

4) At the time of adjusting the height of the headrest of the front seat:

FIG. 6 is a flowchart illustrating a method of controlling the height of the headrest at the time of moving the headrest of the front seat upward or downward according to various embodiments of the present invention.

In this operation of adjusting the height of the headrest, the occupant directly adjusts the height of the headrest, and even in this case, the height of the headrest is restricted by the system according to various embodiments of the present invention.

Referring to the drawing, at the time of directly adjusting the headrest of the front seat, the sensor inputter 10 calculates the forward or rearward slide position of the front seat by receiving signals from the sensors, calculates the angle of the backrest of the front seat, and calculates the height of the front seat by receiving a signal from the height adjusting motor sensor, thereby obtaining current position information of the front seat (S100). Subsequently, the seat controller 100 determines the headrest height adjustable section in accordance with the obtained current position information of the front seat (S101).

Subsequently, when the headrest height adjusting switch is turned on in order to adjust the height of the headrest of the front seat (S400), the front seat adjuster 110 determines, based on a switch on signal, whether the headrest is to be raised or lowered (S401).

As a result of the determination, if the headrest is to be raised, the front seat adjuster 110 determines whether the headrest height adjustable section determined in step S101 corresponds to level 3 (S402), and if the headrest height adjustable section corresponds to level 3, the front seat adjuster 110 determines whether the height of the headrest is higher than the lowermost end height of the headrest which is defined at level 3 (S403). As a result of the determination, if the height of the headrest is equal to or higher than the lowermost end height of the headrest, the process is ended without adjusting the height of the headrest. However, if the height of the headrest is below the lowermost end height of the headrest, the front seat adjuster 110 raises the headrest to the lowermost end height (S404).

Meanwhile, if in step S402, the headrest height adjustable section is not level 3, the front seat adjuster 110 determines whether the headrest height adjustable section is level 2 (S405), and as a result of the determination, if the headrest height adjustable section corresponds to level 2, the front seat adjuster 110 determines whether the height of the headrest is equal to or higher than the raisable height V which is defined at level 2 (S406). As a result of the determination, if the height of the headrest is equal to or higher than the raisable height V which is defined at level 2, the process is ended without adjusting the height of the headrest.

In contrast, in a case in which in step S405, the headrest height adjustable section is not level 2 and in a case in which in step S406, the height of the headrest is already below the raisable height V which is defined at level 2, the front seat adjuster 110 raises the headrest up to the raisable height V (S407).

If in step S401, the headrest is to be lowered based on the switch on signal, the front seat adjuster 110 lowers the headrest in accordance with an adjustment degree of the switch because there is no interference between the headrest and structures in the interior of the automobile (S408).

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for controlling a front seat of an automobile in connection with a headrest, the automobile comprising a sensor inputter which measures a slide position of the front seat, an electric seat inputter which includes a slide switch for sliding the front seat, and a seat controller which includes a front seat adjuster for controlling an operation of the front seat, the method comprising:
automatically lowering, by the front seat adjuster, a height of the headrest in accordance with a position of the front seat input from the sensor inputter when the front seat of the automobile slides forward in an interior of the automobile by a switch operation of the electric seat inputter;
automatically raising, by the front seat adjuster, the height of the headrest in accordance with the position of the front seat input from the sensor inputter when the front seat of the automobile slides rearward in the interior of the automobile by the switch operation of the electric seat inputter;
obtaining, by the sensor inputter, current position information of the front seat by determining a forward or rearward slide position of the front seat by receiving a first signal from a slide motor sensor, determining an angle of a backrest of the front seat by receiving a second signal from a reclining motor sensor, and determining a height of the front seat by receiving a third signal from a height adjusting motor sensor;
determining, by the seat controller, a headrest height adjustable section based on the obtained current position information of the front seat; and
determining, by the front seat adjuster, whether the headrest height adjustable section determined in the determining the headrest height adjustable section corresponds to a level 3 when a reclining switch is turned on to recline the backrest of the front seat, determining, by the front seat adjuster, whether the height of the headrest is higher than a lowermost end height of the headrest which is defined at the level 3 when the headrest height adjustable section corresponds to the level 3, and lowering, by the front seat adjuster, the headrest to the lowermost end height when the height of the headrest is higher than the lowermost end height of the headrest as a result of the determination of whether the height of the headrest is higher than the lowermost end height of the headrest which is defined at the level 3 when the headrest height adjustable section corresponds to the level 3,
wherein a level of limitation in which the headrest height adjustable section is an entire section is defined as a level 1,
wherein a level of limitation in which the height of the headrest is adjustable only to a limit height is defined as a level 2, and
wherein a level of limitation in which a position of the headrest needs to be positioned at a lowermost end is defined as the level 3.

2. The method of claim 1, further comprising:
determining, by the front seat adjuster, whether the front seat is moved forward or rearward with respect to the automobile by receiving a slide switch value from the electric seat inputter when the slide switch is turned on to slide the front seat forward or rearward, and lowering, by the front seat adjuster, the height of the headrest proportionately to a forward movement distance of the front seat when the front seat is moved forward.

3. The method of claim 2, further comprising:
raising, by the front seat adjuster, the height of the headrest proportionately to a rearward movement distance of the front seat when the front seat is moved rearward as a result of the determination of whether the front seat is moved forward or rearward.

4. The method of claim 3, wherein the raising of the height of the headrest includes dividing, by the front seat adjuster, a separation distance from an interior foremost position to an interior rearmost position of the front seat into a plurality of distance sections, setting a predetermined height of the headrest corresponding to each of the divided distance sections, and raising the headrest to a height corresponding to a designated distance section when the front seat is positioned in the designated distance section.

5. The method of claim 4, wherein in the raising of the height of the headrest, when the front seat is moved rearward, the height of the headrest is raised only to the limit height in accordance with the headrest height adjustable section determined in the determining the headrest height adjustable section based on the obtained current position information.

6. The method of claim 1, wherein the lowering of the headrest includes dividing, by the front seat adjuster, a separation distance from an interior rearmost position to an interior foremost position of the front seat into a plurality of distance sections, setting a predetermined height of the headrest corresponding to each of the divided distance sections, and lowering the headrest to a height corresponding to a designated distance section when the front seat is positioned in the designated distance section.

7. The method of claim 1, further comprising:
determining, by the front seat adjuster, whether the headrest height adjustable section is the level 2 when the headrest height adjustable section is not the level 3 in the determining whether the headrest height adjustable section corresponds to the level 3, determining, by the front seat adjuster, whether the height of the headrest is equal to or higher than a raisable height which is defined at the level 2 when the headrest height adjustable section corresponds to the level 2 as a result of the determination of whether the headrest height adjustable section is the level 2 when the headrest height adjustable section is not the level 3 in the determining of whether the headrest height adjustable section corresponds to the level 3, and lowering, by the front seat adjuster, the height of the headrest to the raisable height which is defined at the level 2 when the height of the headrest is equal to or higher than the raisable height.

8. The method of claim 1, further comprising:
setting the level of limitation to the level 2 when the headrest height adjustable section is available to the limit height, setting the level of limitation to the level 3 when the position of the headrest needs to be positioned at the lowermost end, determining, by the front seat adjuster, whether the headrest height adjustable section determined in the determining the headrest height adjustable section based on the obtained current position information of the front seat corresponds to the level 3 when a height adjusting switch is turned on to adjust the height of the front seat, determining, by the front seat adjuster, whether the height of the headrest is higher than the lowermost end height of the headrest which is defined at the level 3 when the headrest height adjustable section corresponds to the level 3, and lowering, by the front seat adjuster, the headrest to the lowermost end height when the height of the headrest is higher than the lowermost end height of the headrest as a result of the determination of whether the height of the headrest is higher than the lowermost end height of the headrest which is defined at the level 3 when the headrest height adjustable section corresponds to the level 3.

9. The method of claim 8, further comprising:
determining, by the front seat adjuster, whether the headrest height adjustable section is the level 2 when the headrest height adjustable section is not the level 3 in the determining whether the headrest height adjustable section corresponds to the level 3 when the height adjusting switch is turned on to adjust the height of the front seat, determining, by the front seat adjuster, whether the height of the headrest is equal to or higher than a raisable height which is defined at the level 2 when the headrest height adjustable section corresponds to the level 2 as a result of the determination of whether the headrest height adjustable section is the level 2 when the headrest height adjustable section is not the level 3 in the determining whether the headrest height adjustable section corresponds to the level 3 when the height adjusting switch is turned on to adjust the height of the front seat, and lowering, by the front seat adjuster, the height of the headrest to the raisable height which is defined at the level 2 when the height of the headrest is equal to or higher than the raisable height.

10. The method of claim 1, further comprising:
determining, by the front seat adjuster, whether the headrest is to be raised or lowered based on a switch ON signal when a headrest height adjusting switch is turned on to adjust the height of the headrest of the front seat, determining, by the front seat adjuster, whether the headrest height adjustable section determined in the determining the headrest height adjustable section based on the obtained current position information of the front seat corresponds to the level 3 when the headrest is to be raised as a result of the determination of whether the headrest is to be raised or lowered based on the switch ON signal when the headrest height adjusting switch is turned on to adjust the height of the headrest of the front seat, determining, by the front seat adjuster, whether the height of the headrest is higher than the lowermost end height of the headrest which is defined at the level 3 when the headrest height adjustable section corresponds to the level 3, and raising, by the front seat adjuster, the headrest to the lowermost end height when the height of the headrest is below the lowermost end height of the headrest.

11. The method of claim 10, further comprising:
determining, by the front seat adjuster, whether the headrest height adjustable section is the level 2 when the headrest height adjustable section is not the level 3 in the determining of whether the headrest height adjustable section based on the obtained current position information of the front seat corresponds to the level 3 when the headrest is to be raised as a result of the determination of whether the headrest is to be raised or lowered based on the switch ON signal when the headrest height adjusting switch is turned on to adjust the height of the headrest of the front seat, determining, by the front seat adjuster, whether the height of the headrest is equal to or higher than a raisable height which is defined at the level 2 when the headrest height adjustable section corresponds to the level 2 as a result of the determination of whether the headrest height adjustable section is the level 2 when the headrest height adjustable section is not the level 3, raising, by the front seat adjuster, the headrest to the raisable height when the headrest height adjustable section is not the level 2 and the height of the headrest is below the raisable height which is defined at the level 2, and lowering, by the front seat adjuster, the headrest in accordance with an adjustment degree of the switch when the headrest is to be lowered based on the switch ON signal in the determining of whether the headrest is to be raised or lowered based on the switch ON signal when the headrest height adjusting switch is turned on to adjust the height of the headrest of the front seat.

* * * * *